United States Patent [19]

Watjer et al.

[11] Patent Number: 5,226,569
[45] Date of Patent: Jul. 13, 1993

[54] RETRACTABLE GARMENT ROD

[75] Inventors: Sheldon J. Watjer; Michael J. Gregg, both of Holland, Mich.

[73] Assignee: Prince Corporation, Holland, Mich.

[21] Appl. No.: 795,795

[22] Filed: Nov. 21, 1991

[51] Int. Cl.⁵ ............................................. B60R 7/00
[52] U.S. Cl. ..................................... 224/313; 224/45; 224/42.46 A; 224/42.45 A; 296/37.7; 211/123
[58] Field of Search ........ 224/282, 311, 313, 42.45 R, 224/42.45 A, 42.46 R, 42.46 A; 296/37.7, 37,8; 211/113, 116, 118, 123, 124; 248/293, 317; 108/28, 29, 44; 16/111 R, 112, 115, 126

[56] References Cited

U.S. PATENT DOCUMENTS

| | | | |
|---|---|---|---|
| 1,435,889 | 11/1922 | Barker | 248/294 |
| 2,219,076 | 10/1940 | Marzilli | 296/37.7 |
| 2,447,908 | 8/1948 | Hoots | 296/37.7 X |
| 2,517,072 | 8/1950 | Zimmer | 296/37.7 |
| 3,385,547 | 5/1968 | West | 248/308 |
| 3,418,681 | 12/1968 | Szabo | 16/115 |
| 3,431,586 | 3/1969 | Bush | 16/115 |
| 3,438,467 | 4/1969 | Milette et al. | 16/115 |
| 4,221,354 | 9/1980 | Kempkers | 248/293 |
| 4,444,344 | 4/1984 | Marcus et al. | 224/313 |
| 4,523,701 | 6/1985 | Armbruster | 223/94 |
| 4,524,890 | 6/1985 | Fulton | 223/94 |
| 4,548,328 | 10/1985 | Bräuning | 211/123 X |
| 4,645,106 | 2/1987 | Pawl | 224/313 |
| 4,720,028 | 1/1988 | Takemura et al. | 224/42.45 A |
| 4,863,081 | 9/1989 | Gabbert | 224/42.45 A |
| 4,872,568 | 10/1989 | Lehman | 211/113 |
| 4,881,673 | 11/1989 | Kapp | 224/311 |
| 4,936,491 | 6/1990 | Calad et al. | 224/42.46 A |
| 5,020,845 | 6/1991 | Falcoff et al. | 224/311 X |
| 5,072,837 | 12/1991 | Rosch | 211/113 |
| 5,107,996 | 4/1992 | Whittaker | 211/113 X |
| 5,176,304 | 1/1993 | Palmer | 224/313 |

OTHER PUBLICATIONS

Aplicant's Exhibit A—no date.

*Primary Examiner*—Henry J. Recla
*Assistant Examiner*—Glenn T. Barrett
*Attorney, Agent, or Firm*—Price, Heneveld, Cooper, DeWitt & Litton

[57] ABSTRACT

A garment hanger support includes a housing for storably receiving a hanger support rod and a pair of spaced arms pivotally attached to opposite ends of the support rod. Each of the pivot arms have ends remote from the pivot mounting of each of the arms to the support rod which are pivotally and slideably mounted within the housing such that the support rod can be moved downwardly while the pivot arms at either end extend outwardly and downwardly forming a generally U-shaped structure when in an extended position. For storage, the support rod is pushed upwardly and the ends of the pivot arms remote from the hanger support slide inwardly and pivot for overlapping contracted storage within the housing with the lower surface of the hanger support rod enclosing the space into which the pivot arms are stored. In a preferred embodiment of the invention, the ends of the pivot arms are intercoupled to one another for synchronous movement between a substantially horizontal collapsed stored position and a substantially vertical extended use position. In a preferred embodiment, a rack and pinion structure is used to synchronize the motion of the arms.

23 Claims, 4 Drawing Sheets

RETRACTABLE GARMENT ROD

BACKGROUND OF THE INVENTION

The present invention pertains to vehicle accessories and particularly to a retractable garment rod for holding garment hangers.

Typically, vehicles are provided with relatively small hooks placed on either side of the headliner of the vehicle behind the front seat for receiving clothes hangers so that clothes can be conveniently carried on a hanger in a hanging position without obstructing the driver's vision or taking up interior space. Such hooks typically are relatively small and can accommodate one or two hangers. An improvement to such standard hooks has been suggested in, for example, U.S. Pat. No. 4,221,354, issued Sep. 9, 1980, and assigned to the present assignee. In this construction, a hook is pivotally mounted within a recess at the side of the headliner and pivots between a stored position within the vehicle headliner and a lowered position for use. Although such a device provides a neat appearing and safer hook than conventional hooks which continuously extend from the roof of a vehicle, the size of the hook and therefore its storage capacity is limited.

U.S. Pat. No. 4,444,344 discloses an improvement to existing garment hooks in providing a swing down U-shaped support which is stored within a recess and held and covered by a sliding door when not used. This mechanism provides slots for up to four hangers and is typically mounted adjacent the edge of a vehicle roof near the side windows. Although improving the storage capacity of preexisting hook-type ports, the system of the '344 patent is still somewhat limited in its ability of holding significant numbers of garment hangers.

SUMMARY OF THE PRESENT INVENTION

The system of the present invention provides an improved retractable garment hanger which has increased storage capability and yet can be attractively and conveniently mounted within the vehicle roof, typically in a transverse orientation so that several hangers can be supported thereon. The retractable garment rod is particularly well suited for use in vans, mini-vans, or hatchback-type vehicles although it can also be used in standard passenger vehicles. The system of the present invention provides a garment or hanger support rod which includes its own closure member on one side which is positioned in flush relationship to a housing for the retractable garment rod.

A system embodying the present invention includes a housing for storably receiving a hanger support rod and a pair of spaced arms pivotally attached to opposite ends of the support rod. Each of the pivot arms have ends opposite the pivot mounting of each of the arms to the hanger support which are pivotally mounted to means for translating within said housing such that the hanger support rod can be moved downwardly while the pivot arms at either end extend outwardly and downwardly forming a generally U-shaped structure when in an extended position. For storage, the hanger support rod is pushed upwardly and the ends of the pivot arms remote from the hanger support slide inwardly and pivot for overlapping contracted storage within the housing with the lower surface of the hanger support rod enclosing the space into which the pivot arms are stored. In a preferred embodiment of the invention, the ends of the pivot arms are intercoupled to one another for synchronous movement between a substantially horizontal collapsed stored position and a substantially vertical extended use position. In a preferred embodiment, the means for synchronizing the ends of the pivot rods comprise a rack and pinion structure. In a preferred embodiment of the invention a pinion gear mechanism includes a viscous damping device for controlling the motion of the hanger support rod and pivot arms.

Such construction provides a significantly larger storage rod for a relatively large number of hangers and one which occupies little space in a vehicle when in a retracted stored position. It provides a neat trim appearance to the vehicle when not in use and a significantly large hanger support structure when needed. These and other features, objects and advantages of the present invention will become apparent upon reading the following description thereof together with reference to the accompanying drawings in which:

DETAILED DESCRIPTION OF THE PREFERRED EMBODIMENT

Figure 1:
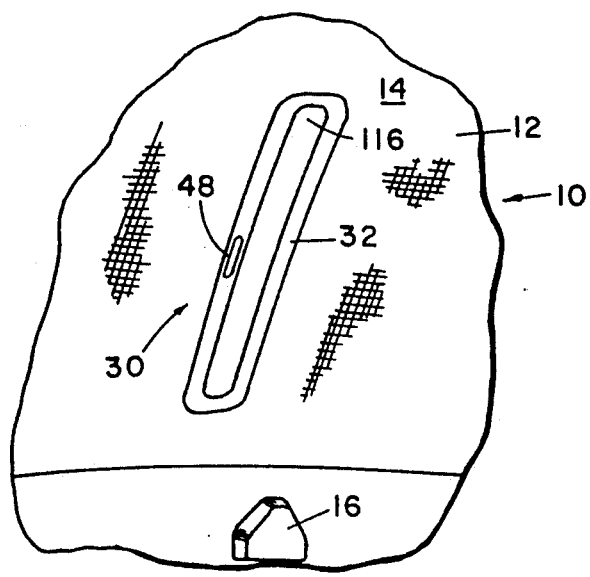
FIG. 1 is a fragmentary perspective view of a vehicle showing in detail a roof area including a retractable garment rod of the present invention shown in a retracted position.

Referring initially to FIG. 1, there is shown a vehicle 10 such as an automobile having a roof 12 typically including underlying support metal roof members such as beams covered by a headliner 14 Which includes a fabric layer exposed to the interior of the vehicle. The area of the vehicle shown is above and slightly behind the driver's seat to which a safety belt 16 is attached at the side area of the vehicle roof. The area above and slightly behind the driver's seat includes a retractable garment rod assembly 20 embodying the present invention and is shown in FIG. 1 in a retracted stored position in which the assembly provides a neat flush appearance within the headliner.

Figure 2:
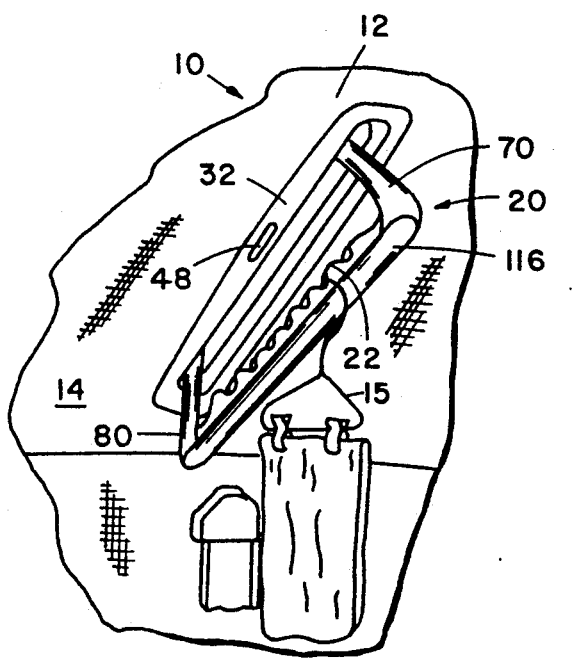
FIG. 2 is a view of the structure shown in FIG. 1 shown in an extended use position.

FIG. 2 shows the garment rod assembly 20 in a lowered use position with a garment hanger support member 22 extending laterally within the vehicle and spaced downwardly from the roof a sufficient distance to easily receive the hook end of garment hangers such as hanger 15 shown in FIG. 2. As can be seen, the garment hanger support member 22 has a length sufficient to receive a significant number of such hangers. Ribs 25 defining skewed grooves 26 (FIGS. 4 and 5) positions the hangers in an angle skewed to the transverse direction of the vehicle such that a plurality of article hangers can be accommodated on member 22 and will not contact the rear of the front seat and therefore distract the vehicle driver. Also by skewing the hangers on the hanger support member, swinging of articles on garment hangers is obviated since the normal acceleration of the oar is in a forward direction. With the hangers skewed approximately 45 degrees to that direction, this mounting arrangement resists rocking of the hangers on the hanger support member and increases the available storage.

Figure 3:
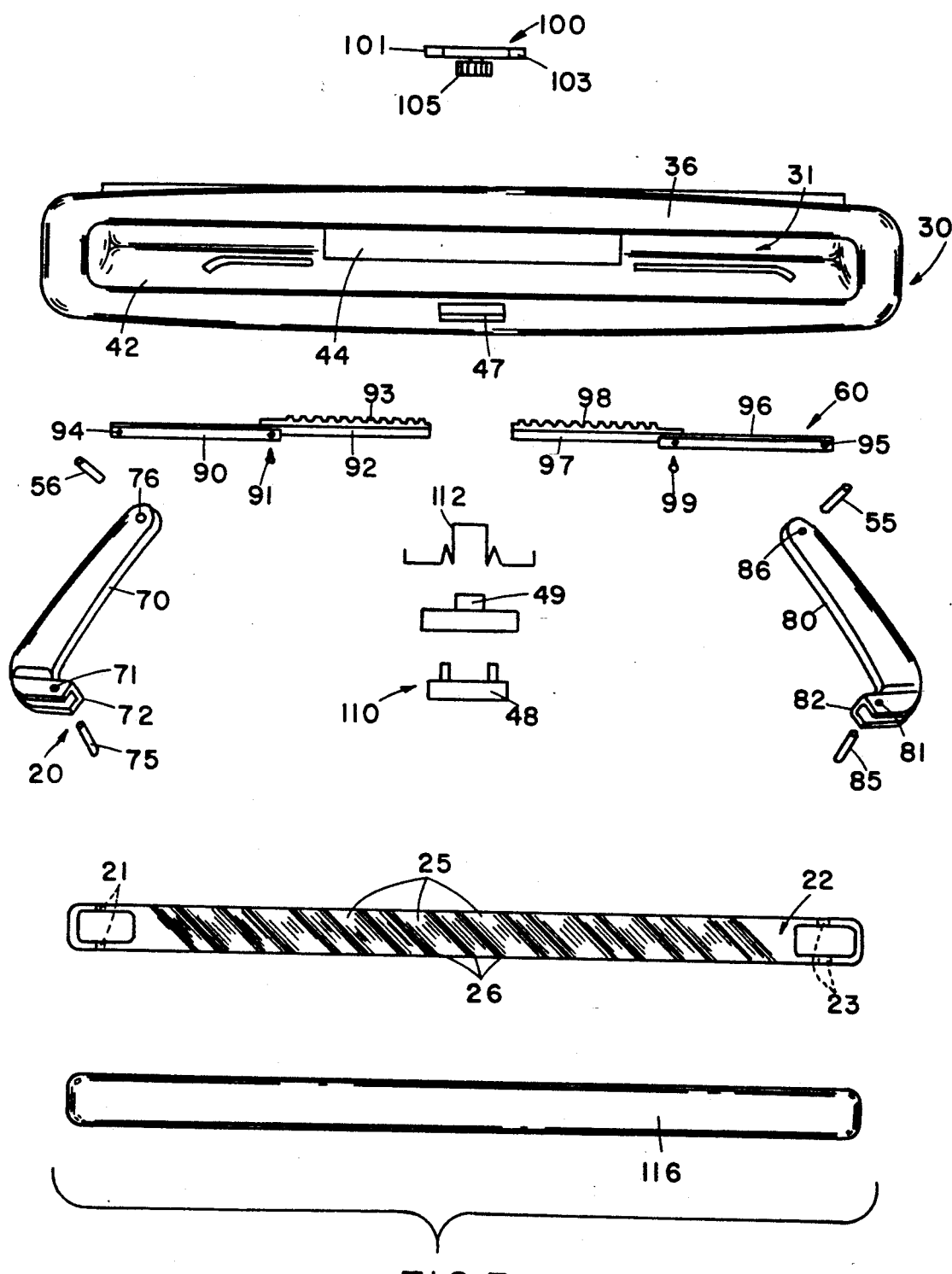
FIG. 3 is an exploded view of the retractable garment rod assembly of the present invention.

The component parts of the retractable garment rod assembly 20 is best seen in FIG. 3. Assembly 20 comprises three major components, the first being housing 30 which controllably and slidably receives a pivot arm assembly 60 including a pair of pivot arms having upper ends which pivot and slide (i.e. translate) within housing and pivot and lower ends which are pivotally coupled to the hanger support arm or member 22. Thus, as will be explained in greater detail in connection with the remaining FIGS., the upper ends of the pivot arms of assembly 60 collapse within the housing 30 and move toward one another when retracted and extend away from one another and lower for supporting the hanger member 22 when in an extended position.

Figure 9:
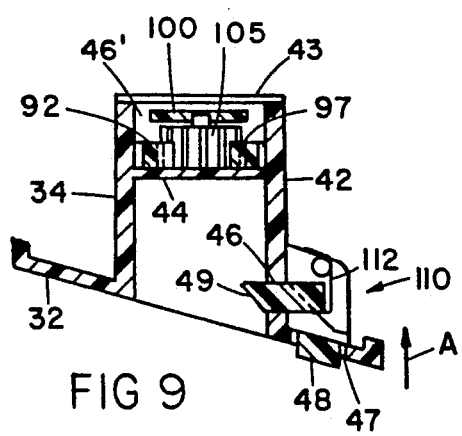
FIG. 9 is an enlarged cross-sectional view of the structure shown in FIGS. 7 and 8 taken along section line IX—IX.

Housing 30 is a generally concave rectangular member having a trim bezel 32 extending around the periphery of an opening 31 into which retractable hanger support member 22 extends. Housing is defined by a generally vertically extending front wall 34, a left side wall 36, a right side wall 38 and a rear wall 42 (FIGS. 4 and 5) all integrally molded with the bezel 32. Housing 30 further o includes a floor 43 having an opening 43, (FIG. 6) therein exposing the control mechanism for the pivot arm assembly. Floor 43 includes a pair of apertures 41 (FIG. 6) at opposite ends for receiving mounting screws for securing housing 30 to a sheet metal support structure forming part of the roof 12 of the vehicle. Spaced from the floor 43 of the housing is an intermediate floor 44 behind which the pivot rod assembly 60 is mounted as best seen in FIGS. 6-9. As seen in FIG. 9, an opening 46' extends between floors 43 and 44 for allowing the control arms of control mechanism 60 to extend behind floor 44 into the pocket defined thereby. Floor 44 thus extends only approximately ⅓ the overall length of floor 43 which allows the pivot arms to tuck upwardly within the aperture 31 of housing 30 adjacent the upper floor 43.

Figure 4:
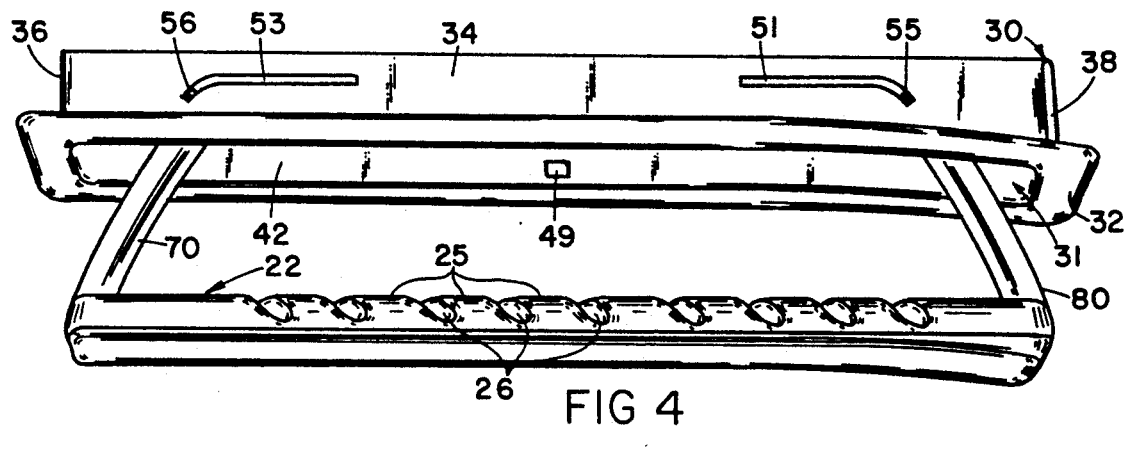
FIG. 4 is a lower front perspective view of the garment rod assembly of the present invention shown in a use position.
Figure 5:
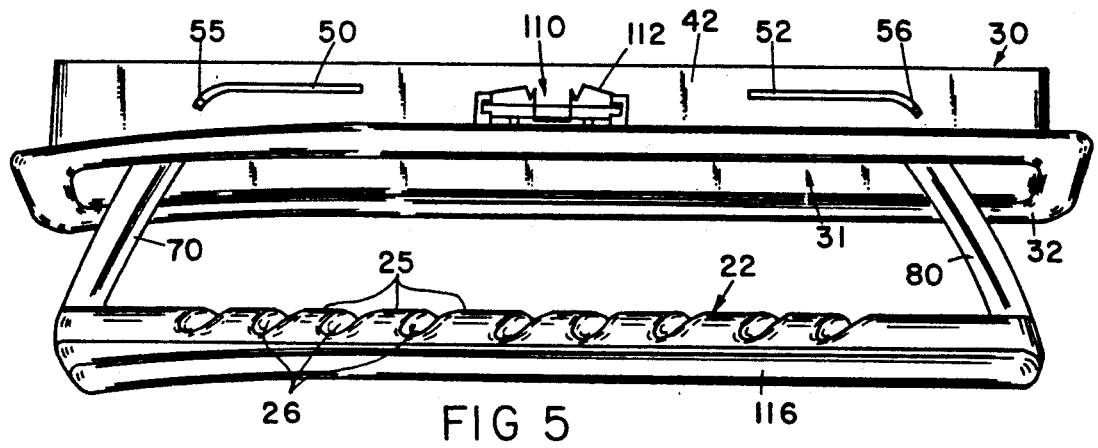
FIG. 5 is a rear perspective view of the garment rod assembly shown in FIG. 4.
Figure 6:
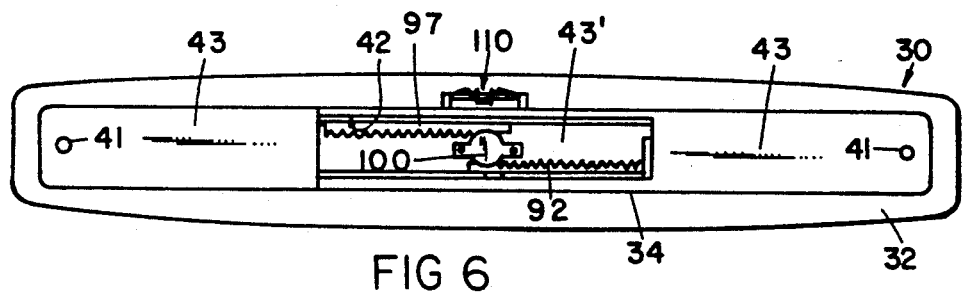
FIG. 6 is a top plan view of the garment rod assembly.

Centrally located near the lower edge of wall 40 of housing 30 is a rectangular opening 46 for receiving a locking tab 49 of a locking mechanism which is actuated by a push button 48 extending through aperture 47 in the edge of bezel 32 as best seen in FIGS. 1, 2, 4 and 9. As seen in FIGS. 4 and 5, each of the walls 34 and 42 include a left side curved generally L-shaped slot 50 and 51 respectively and a right side generally L-shaped slot 52 and 53 respectively. These slots are aligned with one another such that slot 50 and 51 are in aligned relationship across from one another as are slots 52 and 53. The slots define guide means for receiving guide and pivot pins 55 and 56 respectively of the arm control mechanism 60. As best seen in FIGS. 4 and 5, pins 55 and 56 move in a generally horizontal direction from their intermost point of travel from a retracted position of the hanger support 22 to a lower position at the L-shaped end of the slots for lowering the ends of pivot arms 70 and 80 remote from member 22 as best seen in FIGS. 4 and 5. This occurs at the outboard extreme end of the slots. Thus, as member 22 is extended from its stored position, the pivot arms 70 and 80 swing outwardly and thence downwardly to provide clearance for hangers on member 22.

Member 22 is coupled to the housing 30 by means of the control assembly 60 which controls the movement of the upper ends of a pair of pivot arms 70 and 80 which are generally L-shaped each having a lower inwardly projecting end 72 and 82 respectively. Apertures 71 and 81 at the ends of the respective arms receive a pivot pin 75 and 85 respectively (FIG. 3) which extends through apertures 21 and 23 respectively in member 22 for pivotally mounting the lower ends of arms 70 and 80 to the opposite ends of member 22. Member 22 includes a plurality of ridges 25 as best seen in FIGS. 4 and 5 defining grooves 26 therebetween which are inclined at an angle of about 45 degrees as best seen in FIG. 3. As best seen in FIGS. 3, 4 and 5, in the preferred embodiment nine such grooves 26 are provided for supporting at least nine garment hangers although the grooves are sufficiently wide to support two or more hangers per groove.

The upper ends of pivot arms 70 and 80 include apertures 76 and 86 respectively for receiving pivot pins 56 and 55 respectively. Pivot pin 56 extends through aperture 94 in a generally flat rectangular plate 90 for coupling end 76 of arm 70 to the outer end of the plate. Plate 90 has an inboard end coupled to a rack 92 having a plurality of teeth 93 formed therein by a pin 91. Similarly, pin 55 pivotally couples the end 86 of arm 80 within an aperture 95 of a flat member 96 coupled to a second rack 97 by a pin 99. Rack 97 also has a plurality of teeth 98 formed thereon. For purposes of clarity some of the constituent elements of assembly 20 shown in FIG. 3 are rotated from their assembled position as best seen in FIGS. 7-9.

Figure 7:
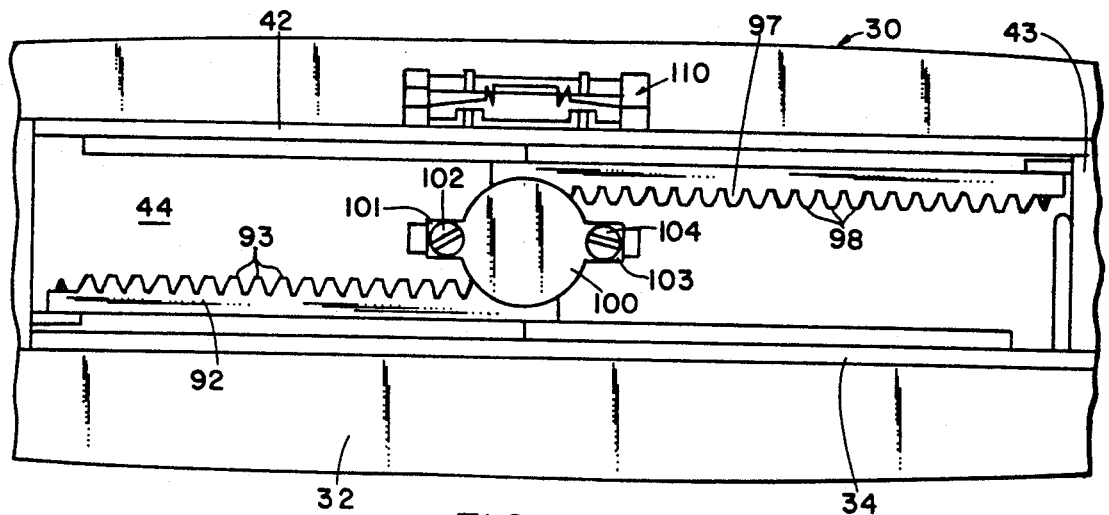
FIG. 7 is an enlarged fragmentary view of a portion of the structure shown in FIG. 6 shown with the garment rod in an extended position.
Figure 8:
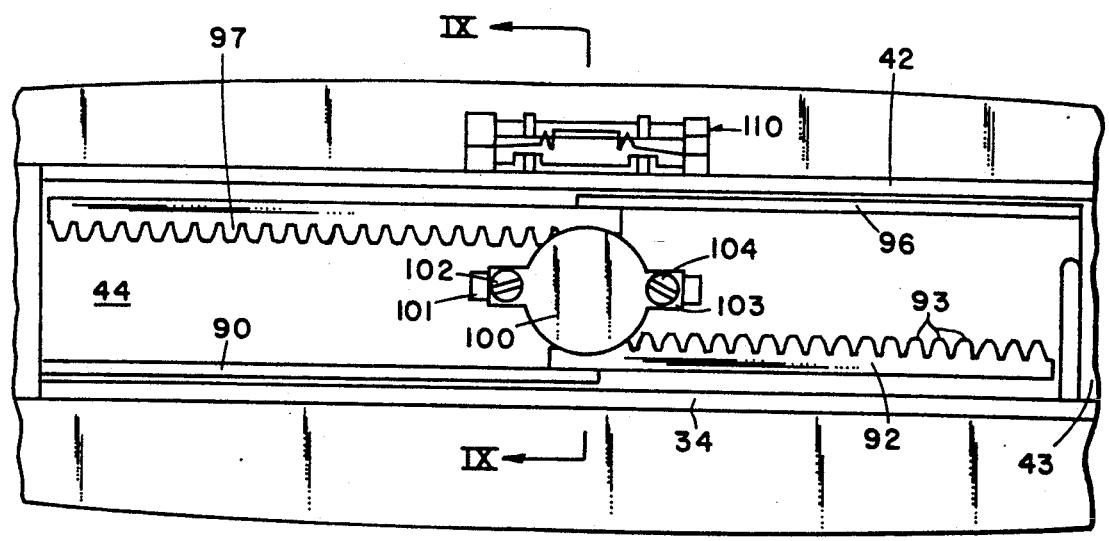
FIG. 8 is an enlarged fragmentary view of a portion of the structure shown in FIG. 6 shown with the garment rod in a retracted position.

The racks 92 and 97 lie with their teeth in a generally vertical plane as best seen in FIGS. 7 and 8 showing a top plan view of the control mechanism 60 such that the teeth engage opposite sides of the teeth of a commercially available pinion gear 100 which is viscously damped and which is mounted to floor 44 by means of mounting screws 102 and 104 which extend through mounting flanges 101 and 103 respectively of the viscous damped gear 100. Unit 100 is commercially available and frequently used for damping the control of storage door covers and the like in automotive vehicles. It serves to interlook the racks 92 and 97 in synchronism such that the upper ends of arms 70 and 80 move the same distance at the same time as well as control the speed of downward movement of member 22 when released by pushing latch button 48 so that member 22 lowers slowly from the recess 31 in housing 30. The pinion gear 105 for assembly 100 is shown in FIG. 3.

A latch assembly 110 (FIGS. 3 and 9) includes the push button release member 48 which extends through aperture 47 in bezel 36 and includes an inclined ramp which engages inclined ramp of the latch 49 which is spring loaded to an extended position by means of a spring 112. Latch 49 extends within an aperture 29 (FIG. 5) of member 22 for holding the member in a raised stored position as illustrated in FIG. 1 when not in use. Pushing control button 48 upwardly in a direction indicated by arrow A in FIG. 9 urges pin 49 outwardly and allows member 22 to lower downwardly under the control of control mechanism 60. Member 22 is covered on its lower side by means of a decorative cover 116 which, as best seen in FIG. 1, provides a smoothly textured surface flush with the vehicle roof 12 and which, like bezel 32, is colored to match the fabric of the headliner 14 to provide an attractive appearing installation. The housing 30, arms 70 and 80, member 22 and cover 116, can be molded of a suitable polymeric material such as polycarbonate or the like. The outer surface of bezel 32 and cover 116 can be textured such as by pebble graining or the like to provide an attractive appearance to the garment hanger when the in the stored position.

The control assembly 60 controls the pivoted and translational movement of the upper ends of pivot arms 70 and 80 to allow for the compact folding of the arms and member 22 within recess 31 adjacent floor 43 and above the spaced second floor 44. Other control mechanisms which synchronize the motion of the upper ends of the arms and speed at which they move also may be employed. These and other modifications to the preferred embodiment of the invention as described herein can be made by those skilled in the art without departing from the spirit or scope thereof as defined by the appended claims.

The embodiments of the invention in which an exclusive property or privilege is claimed are defined as follows.

1. A garment hanger for a vehicle having a roof, said garment hanger for mounting to the roof of a vehicle and comprising:
   a housing for storably receiving a hanger support rod;
   an elongated hanger support rod having opposite ends;
   a pair of spaced arms pivotally attached to opposite ends of said support rod, each of said pivot arms having ends remote from said hanger support rod; and
   means for mounting said remote ends of said pivot arms to said housing for pivotal and translating motion within said housing such that said hanger support rod can be moved out of said housing while said pivot arms extend outwardly forming a generally U-shaped structure for receiving a plurality of garment hangers when in an extended use position.

2. The garment hanger as defined in claim 1 wherein said mounting means includes means for coupling said remote ends of said pivot arms to one another for synchronous movement between a substantially horizontal collapsed stored position of said pivot arms and a substantially vertical extended use position for said pivot arms.

3. The garment hanger as defined in claim 2 wherein said coupling means comprises a rack coupled to at least one of said pivot arms and housing and a pinion gear coupled to the other of at least one of said pivot arms and housing.

4. The garment hanger as defined in claim 3 wherein said rack and pinion structure includes a pair of racks slideable mounted to said housing in spaced generally parallel relationship to one another for movement toward and away from one another and a pinion gear rotatably mounted to said housing and extending between and coupling said racks.

5. The garment hanger as defined in claim 4 wherein said pinion gear includes a damping device for controlling the motion of said hanger support rod.

6. The garment hanger as defined in claim 5 wherein said coupling means further includes a pivot pin for coupling each remote end of each one of said pivot arms to an associated rack.

7. The garment hanger as defined in claim 6 wherein said housing includes a pair of opposed sidewalls and wherein each of said sidewalls includes a pair of guide slots into which one of said pivot pins extend for guidably supporting said remote ends of said pivot arms.

8. The garment hanger as defined in claim 7 wherein said housing further includes latch means engaging said hanger support rod for releasably holding said support rod within said housing.

9. The garment hanger as defined in claim 8 wherein said hanger support rod has a longitudinal axis and further includes a plurality of angled grooves for holding hangers in skewed relationship to the axis of said hanger support rod.

10. A garment hanger for a vehicle having a roof, said garment hanger for mounting to the roof of a vehicle and comprising:
    an elongated housing adapted to be mounted to the roof structure of a vehicle for receiving a hanger support rod;
    an elongated hanger support rod having opposite ends;
    a pair of spaced arms pivotally attached to opposite ends of said support rod, each of said pivot arms having ends remote from said hanger support rod; and
    means for mounting said remote ends of said pivot arms to said housing for pivotal and translating motion within said housing such that said hanger support rod can be moved out of said housing while said pivot arms extend outwardly forming a generally U-shaped structure for receiving a plurality of garment hangers when in an extended use position.

11. The garment hanger as defined in claim 10 wherein said mounting means includes a pair of opposed sidewalls of said housing and wherein each of said sidewalls includes a pair of guide slots and each of said pivot arms includes a pivot pin for mounting each one of said arms to said housing, and each of said pivot pins extend into one of said aligned slots for guidably supporting said remote ends of each of said pivot arms.

12. The garment hanger as defined in claim 11 wherein said mounting means further includes means for coupling said remote ends of said pivot arms to one another for synchronous movement between a substantially horizontal collapsed stored position and a substantially vertical extended use position.

13. The garment hanger as defined in claim 12 wherein said coupling means comprises a rack coupled to at least one of said pivot arms and housing and a pinion gear coupled to the other of at least one of said pivot arms and housing.

14. The garment hanger as defined in claim 13 wherein said rack and pinion structure includes a pair of racks slideably mounted to said housing in spaced generally parallel relationship to one another for movement toward and away from one another and a pinion gear rotatably mounted to said housing and extending between and coupling said racks.

15. The garment hanger as defined in claim 14 wherein said pinion gear includes a damping device for controlling said hanger support rod.

16. The garment hanger as defined in claim 10 wherein said housing includes latch means engagement said hanger support rod for releasably holding said support rod within said housing.

17. The garment hanger as defined in claim 10 wherein said hanger support rod has a longitudinal axis and further includes a plurality of angled grooves for holding hangers in skewed relationship to the axis of said hanger support rod.

18. A garment hanger system for a vehicle comprising:
   an elongated housing defined by four sidewalls and a peripheral outwardly extending bezel, said housing further including first and second spaced floor means extending between said sidewalls;
   an elongated hanger support member having opposite ends and shaped to fit within said housing; and
   means for coupling said hanger support member to said housing for movement between a stored position within said housing and a use position extended from said housing, said coupling means including a pair of pivot arms each of which having one end pivotally coupled to one of said opposite ends of said support member and each of said pivot arms having a second end supported within said housing to extend between said floor means when said support member is in a stored position.

19. The system as defined in claim 18 wherein said coupling means couples said second ends of said pivot arms remote from said hanger support member to one another for synchronous movement between a substantially horizontal collapsed stored position and a substantially vertical extended use position.

20. The garment hanger as defined in claim 19 wherein said coupling means comprises a rack coupled to at least one of said pivot arms and housing and a pinion gear coupled to the other of at lest one of said pivot arms and housing.

21. The garment hanger as defined in claim 20 wherein said rack and pinion structure includes a pair of racks slideably mounted to said housing in spaced generally parallel relationship to one another for movement toward and away from one another and a pinion gear rotatably mounted to said housing and extending between and coupling said racks.

22. The system as defined in claim 21 wherein said pinion gear includes a damping device for controlling said hanger support member.

23. The garment hanger as defined in claim 22 wherein said coupling means further includes a pivot pin coupling said remote end of each one of said pivot arms to an associated groove formed in said sidewalls of said housing for guiding said pivot arms.

* * * * *

UNITED STATES PATENT AND TRADEMARK OFFICE
CERTIFICATE OF CORRECTION

PATENT NO. : 5,226,569
DATED : July 13, 1993
INVENTOR(S) : Sheldon J. Watjer, et al.

It is certified that error appears in the above-indentified patent and that said Letters Patent is hereby corrected as shown below:

In the Abstract, Line 22:

"synohronize" should be --synchronize--.

Column 2, Line 52:

"Which" should be --which--.

Column 3, Line 10:

"oar" should be --car--.

*Column 3, Line 33:

After "Housing" insert --30--.

Column 3, Line 37:

After "further" delete --o--.

*Column 5, Line 13:

After "when" delete --the--.

UNITED STATES PATENT AND TRADEMARK OFFICE
CERTIFICATE OF CORRECTION

PATENT NO. : 5,226,569
DATED : July 13, 1993
INVENTOR(S) : Sheldon J. Watjer, et al.

It is certified that error appears in the above-indentified patent and that said Letters Patent is hereby corrected as shown below:

Column 5, Line 64:

"slideable" should be --slideably--.

Column 7, Line 5:

"engagement" should be --engaging--.

Column 8, Line 12:

"lest' should be --least--.

Signed and Sealed this

Twenty-fourth Day of May, 1994

Attest:

BRUCE LEHMAN

*Attesting Officer*    *Commissioner of Patents and Trademarks*